April 22, 1958 F. H. GUTH 2,832,037

MAGNETIC AMPLIFIER

Filed Nov. 9, 1953

Inventor
FRED H. GUTH by Hill, Sherman, Meroni, Gross & Simpson Attys.

United States Patent Office 2,832,037

Patented Apr. 22, 1958

2,832,037

MAGNETIC AMPLIFIER

Fred H. Guth, Warrensville Heights, Ohio, assignor to Thompson Products, Inc., Cleveland, Ohio, a corporation of Ohio Application November 9, 1953, Serial No. 390,894

7 Claims. (Cl. 323—89)

Figure 1:
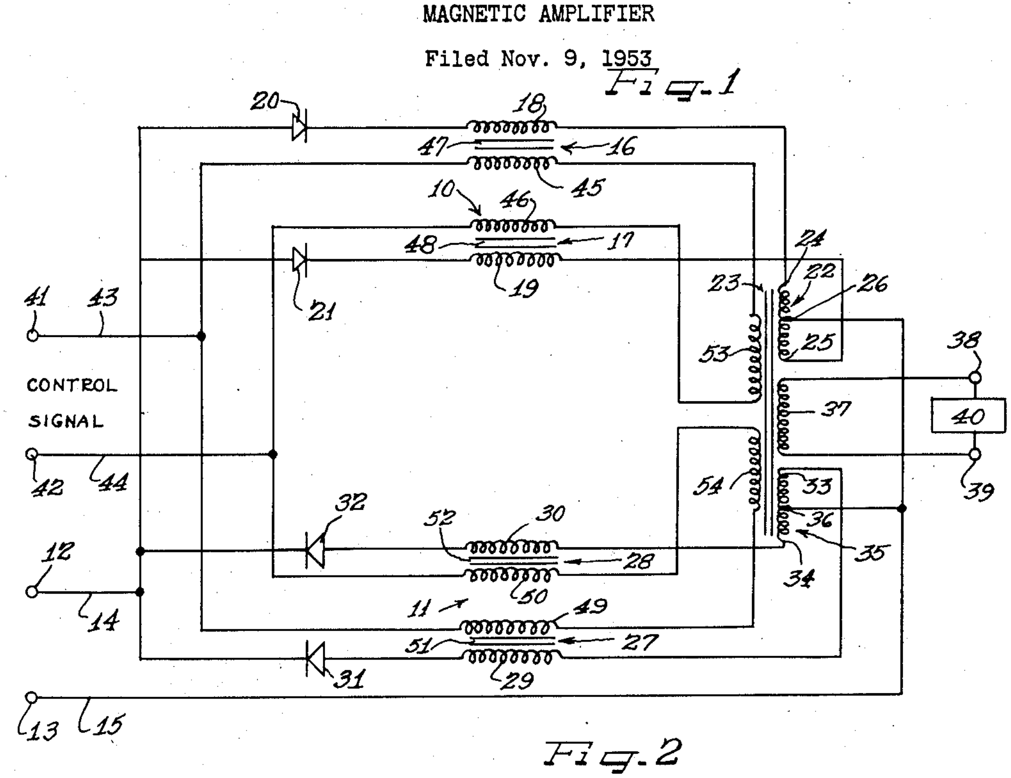

The present invention relates to a magnetic amplifier, and more particularly to a high performance factor magnetic amplifier having improved response time characteristics and improved control winding back induction characteristics.

In general, heretofore known magnetic amplifiers have been limited in their qualities by two major groups of factors. The first group of factors control the magnetic amplifier response time, and the second group of factors control the voltages induced in the control windings and tend to reduce the amplifier gain. Further, it appears that with heretofore known principles of magnetic amplifier construction and circuitry, either one of these groups of factors can be minimized by a choice of an appropriate circuit, but by the principles of the present invention, magnetic amplifiers may be provided with both a reduced response time and back induced voltages, and further are permitted the utilization of theoretical gains which, at present, are otherwise obtainable only with poor response time.

It has been heretofore presumed that magnetic amplifier response time was principally controlled by the *L/R* (inductance in henries, resistance in ohms) time constant ratio for the control circuit; particularly, this has been presumed with regard to full wave magnetic amplifier systems. I have found, however, that the response time of a magnetic amplifier system, and particularly a full wave magnetic amplifier system, can be reduced to its minimum of one cycle of the input frequency, by selectively flux presetting individual reactors and groups of reactors on non-conducting half cycles of each thereof, and by so arranging the reactors in groups thereof, as to provide a full wave output from the amplifier system.

It is, therefore, an important object of the present invention to provide a full wave magnetic amplifier system including several reactors which are so interconnected and oriented as to have flux setting half cycles.

Another important feature of the present invention lies in reducing or eliminating the effects of voltages induced into the control circuit of a magnetic amplifier by induction from the main power winding of the reactors thereof. This feature of the present invention is preferably accomplished through coupling the control circuit for one group of reactors to the power circuit for another group of reactors in such a manner that the induced voltages aid flux resetting and presetting, and further obviate the effects of undesirable and spurious induced voltages in the control circuit.

Still another object of the present invention is to provide a magnetic amplifier system for full wave output and comprised of self-saturating connected reactors intercoupled through control windings.

Still another object of the present invention is to provide a magnetic amplifier for full wave control output and comprising oppositely connected self-saturating reactors, each of which is coupled to the control circuit for the other.

Still another object of the present invention is to provide a magnetic amplifier having reactor windings and control windings so intercoupled and interconnected as to reduce the response time of the system to the minimum therefor, and further, so intercoupled as to obviate the effects of voltages induced into the control circuits by balancing the induced voltages in one circuit against the reactor conduction in another circuit, thereby both obviating effects of induced voltages and aiding flux presetting.

Figure 2:
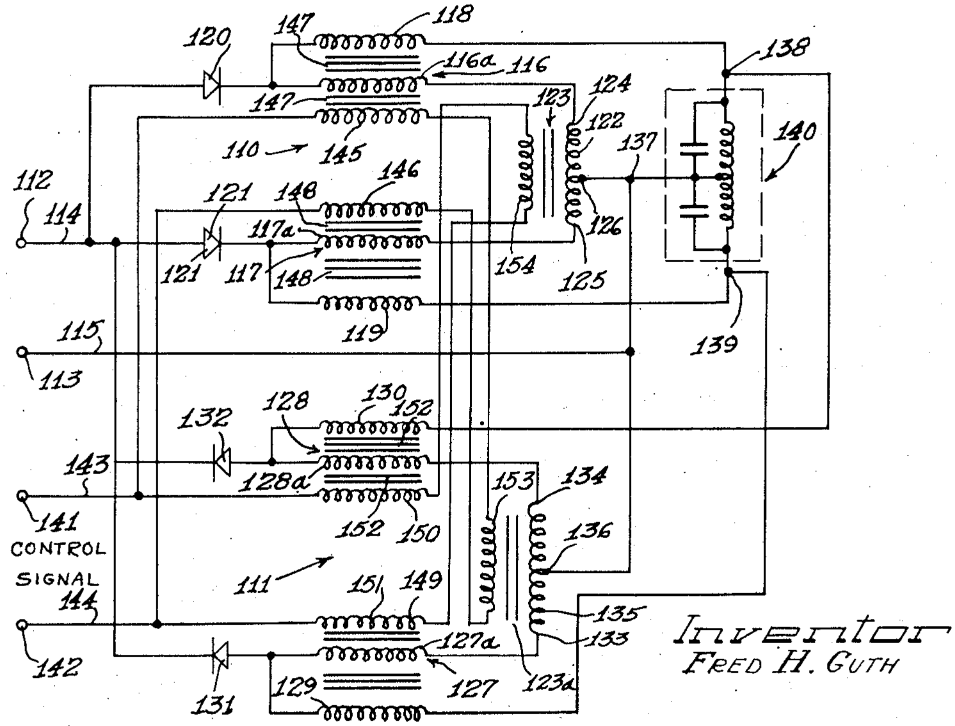

Still other objects, features and advantages of the present invention will become readily apparent from the following detailed description of the preferred embodiments of the present invention and the principles thereof, from the claims, and from the accompanying drawings, full and completely illustrating and disclosing preferred embodiments of the present invention, in which like reference numerals refer to like parts, and in which:

Figure 1 is a schematic illustration of a first preferred form of magnetic amplifier incorporating the principles of the present invention; and, Figure 2 is a schematic illustration of another preferred form of magnetic amplifier incorporating the principles of the present invention.

Although it has been heretofore thought necessary to utilize only a half cycle of the input power in order to improve the response time of a magnetic amplifier and to permit flux presetting of the reactors thereof, magnetic amplifiers incorporating the principles of the present invention accomplish this end, yet permit the utilization of full wave power. The advantages of such a system readily indicate the obvious superiority of the same.

Such a system for providing full wave output from a magnetic amplifier having these improved characteristics is illustrated in Figure 1. The magnetic amplifier of Figure 1 has two groups of associated reactors indicated generally at 10 and 11, respectively, and which are supplied with power from any convenient source (not shown) connected thereto through terminals 12 and 13, and leads 14 and 15.

The first group 10 of reactors includes two reactors 16 and 17, the power windings 18 and 19, respectively, of which are connected through half wave rectifiers or self-saturating devices 20 and 21, respectively, to the input lead 14 and input terminal 12. Both of the rectifiers or self-saturating devices 20 and 21 are oriented for conduction in the same direction from the power source to and through the reactor power windings 18 and 19 of the reactors 16 and 17, respectively, as indicated by the schematic representation of Figure. 1.

Each of the reactor power windings 18 and 19 of the reactors 16 and 17 is connected through a first primary 22 of an output and balancing transformer indicated generally at 23. The coils 18 and 19 are connected to opposite extremes of the first primary 22 as at 24 and 25, respectively, and a center tap 26 on this first primary winding 22 is connected directly to the power input lead 15 and the input terminal 13. Through the several connections, current conduction through the reactor power windings 18 and 19 will be from the input terminal 12, through the lead 14, through the rectifiers or self-saturating devices 20 and 21, through the reactor power windings 18 and 19, through the primary 22 in opposite directions toward the center tap 26 and from the center tap 26, back to the terminal 13 through the lead 15. Further, because of the self-saturating devices or rectifiers 20 and 21, conduction through the reactor windings 18 and 19, and through opposite halves of the first primary 22, is in one direction or on only one half cycle of the input power.

Magnetic amplifier conduction and operation on the other half cycle is permitted through the reactor group 11, including reactors 27 and 28, each having a reactor power winding 29 and 30 connected in series with self-saturating or half wave conduction rectifier elements 31 and 32, respectively. The rectifiers or half wave conduction elements, or self-saturating devices 31 and 32 are also connected together and to the input lead 14 for connection to the power supply source. These self-saturating devices or rectifiers 31 and 32 are also oriented in the same direction, but they are further orientated oppositely with respect to the orientation of the rectifiers 20 and 21 for conduction on the opposite cycle of the input power.

The power windings 29 and 30 of the reactors 27 and 28 are connected to opposite extremes 33 and 34, respectively, of a second primary 35 of the output transformer 23 for conduction therethrough in opposite directions to a center tap 36 which is connected to the line 15 and the terminal 13 of the input supply power.

With this circuitry for the second reactor group 11 of the magnetic amplifier system of Figure 1, conduction through the power windings of the power reactor group 11 is as follows: from the power supply source to the input terminal 13, successively through the input lead 15, through opposite halves of the secondary 35 from the center tap 36 thereof to the opposite extremes 33 and 34 theerof, through the reactor power windings 29 and 30, through the half wave conduction elements 31 and 32, and through the input lead 14 to the input terminal 12 and to the alternating current power supply for power for the magnetic amplifier system.

Since the primaries 22 and 35 of the output transformer 23 are operative on opposite half cycles, they are operative to effect full wave operation of the magnetic amplifier and particularly of the output transformer 23, thereby to provide full wave output power to the output secondary 37 having output terminals 38 and 39 connected to any means 40 to be operated by the magnetic amplifier system. The unit 40 may be any desired load or indicator element or control input element for another system to be controlled, as desired, including even a second magnetic amplifier, whether it incorporates the principles of the present invention or not.

Control of the reactors of the two groups 10 and 11 is effected by providing a control signal thereto from a control signal source (not shown) which may be either a steady state direct current signal, or a fluctuating or pulsating direct current signal, or an alternating current control signal which is properly phased, with respect to the input power, or which may be a pulsating alternating current input control signal which is properly phased with respect to the input power, as desired, in accordance with the principles of the present invention.

The input control signal is provided from any convenient source (not shown) and connected to control signal input terminals 41 and 42, which are in turn connected to input control signal leads 43 and 44, respectively. Initial control of the reactors 16 and 17 of the first group 10 is provided by serially connected control windings 45 and 46, which are inductively coupled to the reactor windings 18 and 19, respectively, through saturable core members 47 and 48 which are illustrated schematically by pairs of line segments. The control windings 45 and 46 are, as stated, serially connected, and further connected directly to the leads 43 and 44 so that control signals supplied thereto effect fluxes of equal magnitudes and opposite directions in the cores 47 and 48 of the reactors 16 and 17. By this connection technique, the reactor power windings 18 and 19 are operated in an apparent magnetic push-pull relation, so that the difference between their conductions is the source for the resultant output from the first primary 22 of the output transformer 23. In the primary 22 the currents are in opposing directions in the two halves thereof, as fed from the power windings 18 and 19, and as controlled by the degree of saturation of the reactor cores 47 and 48 of the reactors 16 and 17, respectively.

The second reactor group 11 is similarly controlled by series-connected reactor control windings 49 and 50 magnetically coupled to the reactor power windings 29 and 30, respectively, through saturable core members 51 and 52 respectively, as indicated by the double line segments in the reactors 27 and 28. These control windings 49 and 50 are serially connected, and further connected to the control signal inlet leads 43 and 44 for energization by the control signal. Energization of the control windings 49 and 50 has the same effect upon the current through the reactor control windings 29 and 30 as the control windings 49 and 50 had on the power windings 18 and 19 of the reactors 16 and 17. In this manner of control, the reactor power windings 29 and 30 are operated in an effective push-pull magnetic relation for conduction through the opposite halves or the opposing halves of the secondary 35, so that the difference between the conduction of each of these windings creates a resultant magnetic effect in the output transformer 23 on the second half cycle of the input power supply.

In this manner of operation, the two primaries 22 and 35 are effective to provide for full wave operation of the output secondary 37 and thereby provide for full wave operation of the magnetic amplifier system of Figure 1.

The magnetic amplifier system of Figure 1 is operable with a reduced response time since each of the reactor groups 10 and 11 are half wave operated, thereby permitting flux presetting and resetting on the non-operating or non-conductive cycles. By virtue of the utilization of half wave conduction elements in series with each of the reactive power windings, each of the reactors is only half wave operable. On the non-operating half cycles, the flux is preset through the current conditions which existed at the termination of the operating half cycle. This condition operates to preset the flux in its saturable cores of the reactors for the next operating half cycles thereof, respectively. The condition is further enhanced and improved to insure proper operation and flux pre-setting during the non-operating half cycles by additional control circuit windings 53 and 54, which are respectively connected in series with the control windings of the first reactor group 10 and the second reactor 11 group. That is, the supplementary control winding 53 is in series with the control windings 45 and 46, while the supplementary control winding 54 is connected in series with the control windings 49 and 50. Further, these control windings 53 and 54 are formed as tertiary windings on the transformer 23, so that they are magnetically coupled to the first and second primaries 22 and 35 of the transformer 23.

During the non-operating half cycle for the reactor group 10, the reactor group 11 is operating as hereinabove described to present an effective difference current into the secondary 35 for a flux condition in the transformer 23 corresponding to the difference between the currents in the power winding 29 and the power winding 30. This flux condition generates a potential in the tertiary winding 53 and is of such orientation and polarity as to be effectively aiding in flux setting and presetting of the flux condition in each of the reactors 16 and 17.

Similarly, when the reactor group 11 is in its non-operating half cycle, the resultant flux from the first primary 22 generates a potential in the tertiary winding 54 which is so oriented and has such a polarity as to aid flux presetting and resetting for the reactors 27 and 28.

By virtue of this full wave balanced arrangement between the two groups of reactors in the magnetic amplifier of Figure 1, the response time of the magnetic amplifier is positively reduced to its minimum response time of one cycle the input frequency its power input terminals 12 and 13.

An additional and most desirable effect is also created through the principles of the present invention; this effect being a reduction or cancellation of induced potentials in the control windings which are directly coupled to the reactor power windings.

The operational characteristics of a magnetic amplifier reactor are such that current passes through the reactor's power winding at a magnitude which is an inverse function of the state of saturation of the core. Control of the saturation of the core, therefore, is effective to accurately control current conduction through the power winding; and this control of core saturation is effected by the control windings and the control signal applied thereto. It will be noted, however, that any state of saturation of the core which is less than full saturation permits a potential to be induced into the control winding by a flux change in the core resulting from current through the power winding. This reverse potential in the control winding has a deleterious effect upon the accuracy of the control for the magnetic amplifier and further tends to seriously reduce the gain of the magnetic amplifier. When two reactors are connected in series opposition, as they are connected in the groups 10 and 11, respectively, the magnetic amplifier of Figure 1, the accuracy and gain of the amplifier is reduced by a function of the difference between the currents of the reactor power windings, such as the difference current between the power windings 18 and 19 and the difference current between the power windings 29 and 30.

To counteract this reduction in accuracy and gain caused by the back induced potentials into the control circuits advantage is taken of the natural and inherent minimum time delay of one cycle of the magnetic amplifier in accordance with the principles of the present invention. Further, to reduce this deleterious effect, advantage is also taken of the flux setting and presetting qualities of the magnetic amplifier embodying the principles of the present invention.

Since there is an inherent time delay of about one cycle, and further, since these magnetic amplifiers are provided with flux presetting qualities, the potential induced into the tertiary winding 53 for the reactor group 10 is induced by the difference current in the primary 35 in the non-operating half cycle of the reactor group 10, the potential generated in the tertiary winding 53 is of a sufficient magnitude to preset the flux in the reactors 16 and 17 at such a level as to substantially completely counteract and obviate back induction effects into the control windings 45 and 46 from currents through the power windings 18 and 19 at a period of a half cycle prior to the creation of the reverse or back induction and, therefore, a full cycle prior to the output in a manner to completely obviate these effects.

Considering this composition in a slightly different manner, it will be seen that the current difference flux generated in the transformer 23 from the primary 35 induces a potential in the winding 53 which is opposite to any back induction potentials which may be induced into the control windings 45 and 46 of reactors 16 and 17, since the effective back induction potential in these control windings is the effective difference between the back induction in reactor 16 and the back induction in reactor 17, due to the opposing arrangement of the control windings 45 and 46. The potential generated into the winding 53 from the primary 35 aids in presetting the flux of the reactors 16 and 17 in the non-operating half cycle of those reactors and at a level which will counteract the difference deleterious by conduction into the control windings 45 and 46.

In a like manner, the current difference generated flux in the transformer 23 resulting from the difference between the currents in the opposite halves of the primary 22 operates to generate a potential in the winding 54, during the non-operating half cycle of the reactor group 11, which is of such magnitude and polarity as to preset the flux of the reactors 27 and 28 at such a level as to counteract and obviate any back induction into the control windings 49 and 50 during the following operating half cycle. These combined effects thereby operate to increase the accuracy and gain of the magnetic amplifier system of Figure 1 to substantially theoretical values therefor, and further, permit full cycle operation in the magnetic amplifier.

In the magnetic amplifier illustrated in Figure 2, all of the above described characteristics are incorporated in accordance with the principles of the present invention. This second preferred embodiment of the magnetic amplifier embodying the principles of the present invention also has two reactor groups identified at 110 and 111, which are provided with an input power from a source (not shown) of any desired character, such as any alternating current source, and connected to the power source terminals 112 and 113 for conduction into the magnetic amplifier over power inlet leads 114 and 115.

The first reactor group 110 has two reactors 116 and 117, each of which is provided with a reactor power winding 118 and 119 connected in series with a unidirectional half wave, self-saturating, rectifier element 120 and 121, respectively. The reactor power windings 118 and 119 are also connected across opposite ends of a load indicated generally at 140, which has extreme terminals 138 and 139 to which the reactor power windings 118 and 119 are respectively connected, and a third terminal 137, which may be a center tap or the like, and which is connected to the power input lead 115 for power current conduction therethrough to the power inlet terminal 113. The back side of each of the self-saturating or rectifier elements 120 and 121 is connected, jointly, to the power input lead 114 in the input terminal 112 for conduction in the same direction through the reactor power windings 118 and 119. The load 140 has been illustrated as a balanced impedance load having a center tapped inductance with opposite halves thereof connected in parallel with capacitors. It will be noted, however, that the precise character of the load 140 is not a controlling factor in the principles of the present invention and that the load may be any desired load as discussed above with regard to the load 140 on the magnetic amplifier of Figure 1.

The second reactor group 111 also has a pair of reactors indicated generally at 127 and 128, each of which has a reactor power winding 129 and 130 connected to opposite ends of the load 140 as at 139 and 138, respectively, and which power windings 129 and 130 are connected in series with unidirectional, self-saturating, half wave, rectifier units or the like 131 and 132 which are further connected to the power inlet 114. The self-saturating or rectifier devices 131 and 132 are similarly oriented with respect to each other, and oppositely oriented with respect to the rectifiers 120 and 122, which are also similarly oriented with respect to each other.

The magnetic amplifier of Figure 2 is also provided with an input control signal from any desired source (not shown) as discussed above in connection with the magnetic amplifier of Figure 1, and connected to control input signal terminals 141 and 142, which are in turn connected through control signal input leads 143 and 144 into the magnetic amplifier and specifically to the control windings thereof. The reactor group 110 is provided with a pair of series-connected control windings 145 and 146 which are individually associated with the reactors 116 and 117, respectively, and connected in series across the input terminals 141 and 142 through the leads 143 and 144. These control windings 145 and 146 are magnetically associated with the reactor power windings 118 and 119, respectively, through saturable core members 147 and 148 for operating the reactor power windings 118 and 119 in an effective magnetic push-pull arrangement such as that described above for the magnetic amplifier of Figure 1.

In a like manner, the reactors 127 and 128 of the second reactor group 111 are provided with series-connected control windings 149 and 150 respectively associated with the reactor windings 129 and 130 through saturable core members 151 and 152, respectively. These windings 149 and 150 are also connected in series across the control signal input leads 143 and 144.

The reactors 116, 117, 127 and 128 differ from the reactors 16, 17, 27 and 28 in that they each include a third winding identified as a reference winding and further identified by the numerals 116*a*, 117*a*, 127*a* and 128*a*, respectively. The reference windings are each connected in series with the self-saturating devices 120, 121, 131 and 132, respectively, and at their opposite ends they are connected in pairs across primaries 122 and 135 of balancing transformers or the like 123 and 123*a*, respectively. That is, the reactor reference windings 116*a* and 117*a* of the reactors 116 and 117 are connected to the extreme terminals 124 and 125 of the primary 122 of a first balancing transformer 123, while the reference windings 127*a* and 128*a* are connected to the opposite extreme terminals 133 and 134 of the primary 135 of a second balancing transformer 123*a*. Center taps 126 and 136 of the primaries 122 and 135 are connected together and to the power supply input lead 115 and input terminal 113.

Secondary windings 153 and 154 on the transformers 123*a* and 123, respectively, are connected in series with the control windings of the second reactor group 111 and the first reactor group 110, respectively. That is, the secondary winding 153 of the transformer 123*a* is connected in series with the control windings 145 and 146 of the first reactor group 110, while the secondary winding 154 of the transformer 123 is connected in series with the control windings 149 and 150 of the second reactor group 111.

It will be readily observed that the principles of the present invention and the operating characteristics of magnetic amplifiers embodying those principles are incorporated in the magnetic amplifier of Figure 2 in the same manner in which they are incorporated into the magnetic amplifier of Figure 1. The magnetic amplifier of Figure 2, however, includes the additional features of reference windings in each of the reactors, thereby reducing the burden on the flux presetting elements since they operate in aid of those elements and further reduce the burden on the reactor output windings by removing the load of the compensating windings therefrom. Therefore, operational characteristics of the magnetic amplifier of Figure 2 are still further improved and provide for a still greater gain and output efficiency.

From the foregoing it will be readily observed that numerous variations and modifications may be effected without departing from the spirit and scope of the novel concepts and principles of the present invention. I, therefore intend to cover all such modifications and variations as fall within the spirit and scope of the novel concepts and principles of my invention.

I claim as my invention:

1. In a magnetic amplifier, a pair of groups of reactors, a pair of reactors in each of said groups, a power winding and a control winding in each of said reactors and means magnetically coupling the control windings with the power windings respectively, a unidirectional conduction element in series with each of said power windings, the unidirectional elements of a first of said pair of groups having the same orientation and the unidirectional elements of the second of said air of groupps having an orientation opposite to the orientation of the unidirectional conduction elements of the first group, and means to couple said reactors to a load to full wave energize the same in accordance with the conduction difference between the power winding of the first group on a first half wave and in accordance with the conduction difference between the power winding of the second group on the second half wave, the control windings of the first group of reactor connected in series and further connected in parallel with the control winding of the second group of reactors which are also connected in series, and an additional winding in series with the series connected control windings of each group and coupled to the reactors of the opposite group to provide a potential in aid of flux setting and of sufficient magnitude to obviate effects of potentials induced in the control winding by the power winding with which they are associated.

2. In a magnetic amplifier, a pair of groups of reactors, a pair of reactors in each of said groups, a power winding and a control winding in each of said reactors and means magnetically coupling the control windings with the power windings respectively, a unidirectional conduction element in series with each of said power windings, the unidirectional elements of a first of said pair of groups having the same orientation and the unidirectional elements of the second of said pair of groups having an orientation opposite to the orientation of the unidirectional conduction elements of the first group, and means to couple said reactors to a load to full wave energize the same in accordance with the conduction difference between the power winding of the first group on a first half wave and in accordance with the conduction difference between the power winding of the second group on the second half wave, the control windings of the first group of reactors connected in series and further connected in parallel with the control winding of the second group of reactors which are also connected in series, and an additional winding in series with the series connected control windings of each group and coupled to the reactors of the opposite group to provide a potential in aid of flux setting.

3. In a magnetic amplifier, a pair of groups of reactors, a pair of reactors in each of said groups, a power winding and a control winding in each of said reactors and means magnetically coupling the control windings with the power windings respectively, a unidirectional conduction element in series with each of said power windings, the unidirectional elements of a first of said pair of groups having the same orientation and the unidirectional elements of the second of said pair of groups having an orientation opposite to the orientation of the unidirectional conduction elements of the first group, and means to couple said reactors to a load to full wave energize the same in accordance with the conduction difference between the power winding of the first group on a first half wave and in accordance with the conduction difference between the power winding of the second group on the second half wave, the control windings of the first group of reactors connected in series and further connected in parallel with the control winding of the second group of reactors which are also connected in series, and an additional winding in series with the series connected control windings of each group and coupled to the reactors of the opposite group to provide a potential of sufficient magnitude to obviate effects of potentials induced in the control winding by the power winding with which they are associated.

4. A magnetic amplifier comprising, a first pair of reactors each having a power winding and a control winding, a second pair of reactors each having a power winding and a control winding, and a transformer having a first primary connected to said power windings of said first pair of reactors to couple the same to a load to act thereon in opposition to each other and a further primary winding on said transformer connected to said power windings of said second pair of reactors to couple the same to a load to act thereon in opposition to each other, and additional windings on said transformer selectively connected in series with the control windings of said first pair of reactors and the control windings of said second pair of reactors.

5. A magnetic amplifier comprising, a first pair of reactors each having a power winding and a control winding and a reference winding, a second pair of reactors each having a power winding and a control winding and a reference winding, a unidirectional conduction element in series with each of said power windings and said reference windings, and means to couple said power windings in said first pair of reactors to a load to act thereon in oposition to each other, and means to couple said power windings of said second pair of reactors to a load to act thereon in opposition to each other, means connecting the reference windings of said first pair of reactors in opposition, means connecting the reference windings of said second pair of reactors in opposition, and means coupling the control windings of the first pair of reactors to the reference windings of the second pair of reactors and the control windings of the second pair of reactors to the reference windings of the first pair of reactors.

6. A magnetic amplifier comprising, a first pair of reactors each having a power winding and a control winding and a reference winding, a second pair of reactors each having a power winding and a control winding and a reference winding, a unidirectional conduction element in series with each of said power windings and said reference windings, and means to couple said power windings in said first pair of reactors to a load to act thereon in opposition to each other, and means to couple said power windings of said second pair of reactors to a load to act thereon in opposition to each other, means connecting the reference windings of said first pair of reactors in opposition, means connecting the reference windings of said second pair of reactors in opposition, and means coupling the control windings of the first pair of reactors to the reference windings of the second pair of reactors, and means coupling the control windings of the second pair of reactors to the reference windings of the first pair of reactors, said means coupling said reference windings in opposition including primary windings of transformers and said means coupling said control windings of one pair to the reference windings of the other pair including secondary windings on said transformers.

7. In a magnetic amplifier, a pair of reactor means each including at least one power winding and at least one control winding, means for coupling said control windings to a control signal source, unidirectional conduction devices for connecting said power windings to a source of alternating current and so oriented as to conduct current through said power windings on alternate half cycles, and transformer means including a pair of primary windings coupled in circuit with said power windings and the source of alternating current, and a pair of secondary windings coupled to said reactor means to supply a transient feed back signal to each of said reactor means during the half cycle when current flows through the power winding of the other of said pair of reactor means.

References Cited in the file of this patent

UNITED STATES PATENTS

| | | |
|---|---|---|
| 720,884 | Burgess et al. | Feb. 17, 1903 |
| 2,571,708 | Graves | Oct. 16, 1951 |
| 2,677,796 | Geyger | May 4, 1954 |

OTHER REFERENCES

Publication entitled: "Fast Response with Magnetic Amplifiers," by D. G. Scorgie, NLR Report 4205, July 29, 1953.

Publication entitled: "On the Control of Magnetic Amplifiers," by R. A. Ramey, AIEE Technical paper 51–389, September 1951.